（12） United States Patent
Shirasaki et al.

(10) Patent No.: US 6,943,753 B2
(45) Date of Patent: Sep. 13, 2005

(54) INPUT CHANNEL SWITCHING CONTROL DEVICE FOR DISPLAY MONITOR AND METHOD OF CONTROLLING INPUT CHANNEL SWITCHING OF DISPLAY MONITOR

(75) Inventors: Yoshiyuki Shirasaki, Tokyo (JP);
Kazuo Yoshioka, Tokyo (JP)

(73) Assignee: NEC-Mitsubishi Electric Visual Systems Corporation, Tokyo (JP)

( * ) Notice: Subject to any disclaimer, the term of this patent is extended or adjusted under 35 U.S.C. 154(b) by 392 days.

(21) Appl. No.: 10/187,847

(22) Filed: Jul. 3, 2002

(65) Prior Publication Data

US 2003/0025685 A1 Feb. 6, 2003

(30) Foreign Application Priority Data

Jul. 17, 2001 (JP) ..................................... P2001-216575

(51) Int. Cl.[7] ................................................ G09G 5/00
(52) U.S. Cl. .......................... 345/3.1; 345/1.1; 345/3.4; 710/16
(58) Field of Search ................................. 345/204, 211, 345/1.1, 3.1, 3.4; 710/15, 16

(56) References Cited

U.S. PATENT DOCUMENTS 6,618,773 B1 * 9/2003 Chang et al. ................. 710/16

2001/0004257 A1 * 6/2001 Nitta et al. ................. 345/211
2004/0150650 A1 * 8/2004 Mendelson et al. ......... 345/589

FOREIGN PATENT DOCUMENTS

| JP | 10-11039 | 1/1998 |
| JP | 11-15425 A | 1/1999 |
| JP | 11-15457 | 1/1999 |
| JP | 11-231994 A | 8/1999 |

* cited by examiner

*Primary Examiner*—Amr A. Awad
*Assistant Examiner*—Alecia D. Nelson
(74) *Attorney, Agent, or Firm*—Birch, Stewart, Kolasch & Birch, LLP

(57) ABSTRACT

Discriminator receiving a DDC transmission request from an external computer through a DDC control, judges whether a video signal inputted from the computer is a signal of analog specification or digital specification from an analog channel input detection signal from an analog synchronizing signal detector. On the basis of the judgment result, the discriminator controls the DDC control, input channel switch and OSD switch to switch EDID data, an input channel and OSD into ones supporting the specification of the video signal, respectively. In a display monitor having a DDC function which includes a DVI-I connector, with the above constitution, a correct setting of the input channel, EDID data and the like is automatically made in accordance with the specification of the input signal.

4 Claims, 13 Drawing Sheets

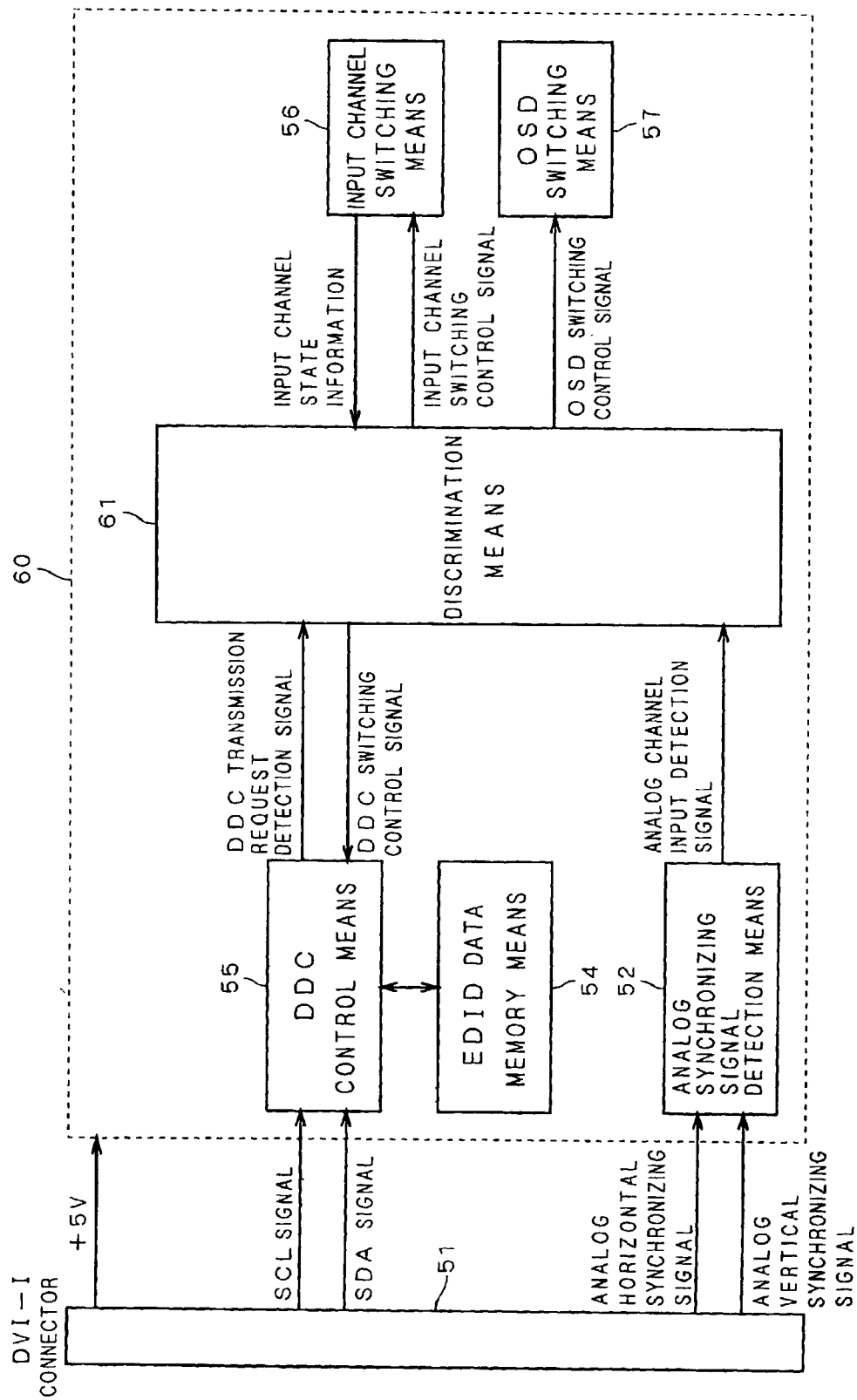
F I G . 3

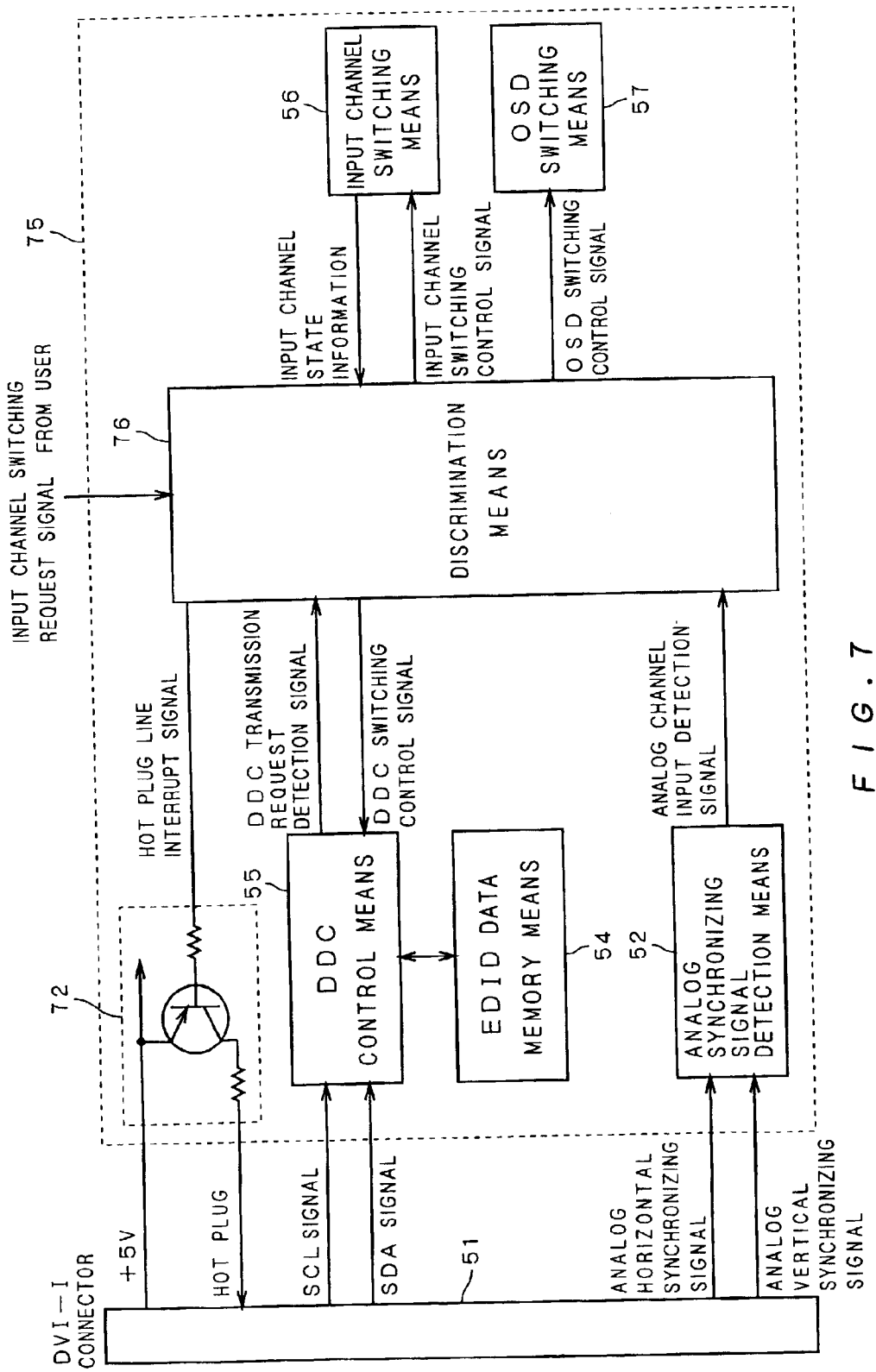
F I G. 7

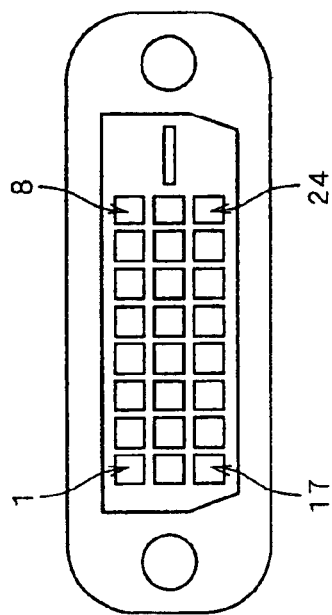

FIG. 11 PRIOR ART

DVI-D CONNECTOR PIN ASSIGN

| Pin | Signal Assignment | Pin | Signal Assignment | Pin | Signal Assignment |
|---|---|---|---|---|---|
| 1 | TMDS Data2- | 9 | TMDS Data1- | 17 | TMDS Data0- |
| 2 | TMDS Data2+ | 10 | TMDS Data1+ | 18 | TMDS Data0+ |
| 3 | TMDS Data2/4 Shield | 11 | TMDS Data1/3 Shield | 19 | TMDS Data0/5 Shield |
| 4 | (TMDS Data4-) | 12 | (TMDS Data3-) | 20 | (TMDS Data5-) |
| 5 | (TMDS Data4+) | 13 | (TMDS Data3+) | 21 | (TMDS Data5+) |
| 6 | SCL | 14 | +5V Power | 22 | TMDS Clock Shield |
| 7 | SDA | 15 | Ground | 23 | TMDS Clock+ |
| 8 | No Connect | 16 | Hot Plug Detect | 24 | TMDS Clock- |

( ) FOR DUAL RING

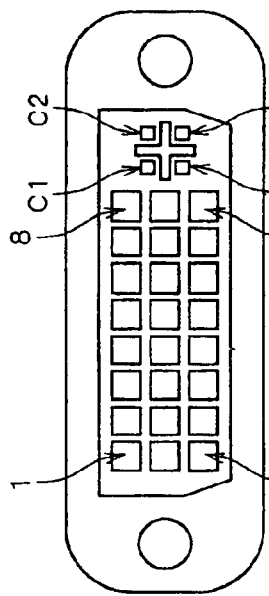

FIG. 12 PRIOR ART

DVI-I CONNECTOR PIN ASSIGN

| Pin | Signal Assignment | Pin | Signal Assignment | Pin | Signal Assignment |
|---|---|---|---|---|---|
| 1 | TMDS Data2- | 9 | TMDS Data1- | 17 | TMDS Data0- |
| 2 | TMDS Data2+ | 10 | TMDS Data1+ | 18 | TMDS Data0+ |
| 3 | TMDS Data2/4 Shield | 11 | TMDS Data1/3 Shield | 19 | TMDS Data0/5 Shield |
| 4 | (TMDS Data4-) | 12 | (TMDS Data3-) | 20 | (TMDS Data5-) |
| 5 | (TMDS Data4+) | 13 | (TMDS Data3+) | 21 | (TMDS Data5+) |
| 6 | SCL | 14 | +5V Power | 22 | TMDS Clock Shield |
| 7 | SDA | 15 | Ground | 23 | TMDS Clock+ |
| 8 | Analog V-Sync | 16 | Hot Plug Detect | 24 | TMDS Clock- |
| C1 | Analog Red | C2 | Analog Green | C3 | Analog Blue |
| C4 | Analog H-Sync | C5 | Analog Ground | | |

( ) FOR DUAL RING

INPUT CHANNEL SWITCHING CONTROL DEVICE FOR DISPLAY MONITOR AND METHOD OF CONTROLLING INPUT CHANNEL SWITCHING OF DISPLAY MONITOR

BACKGROUND OF THE INVENTION

1. Field of the Invention

The present invention relates to a display monitor having a DDC (Display Data Channel) function, and more particularly to an input channel switching control device for a display monitor which includes a DVI-I interface capable of inputting video signals of analog specification and digital specification.

2. Description of the Background Art

The DDC function is a function defined in the DDC standard, for achieving an automatic environment setting function, i.e., plug-and-play, on a computer system. The DDC standard defines signal lines and a procedure for data exchange between a computer and a display monitor. That is, a display monitor supporting the DDC standard is connected to a computer, the computer can take information on the display monitor (hereinafter, referred to as "EDID (Extended Display IDentification)"), which is required for the plug-and-play, from the display monitor through a DDC communication with the display monitor.

The EDID data is stored in a nonvolatile memory such as an EEPROM (Electrically Erasable and Programmable Read Only Memory) provided inside the display monitor and contains information on manufacturer/product ID, specification on the display monitor, support timing and the like.

Further, an analog interface including a typical D-Sub connector specification has been conventionally used as an interface of a display monitor. Most of flat displays such as a liquid crystal display (LCD), however, have a digital interface, and for example, when a display such as an LCD having the digital interface is connected to a computer having an output of D-Sub connector specification, there is apprehension that deterioration of display quality and an increase in cost for the device are caused by analog/digital (A/D) conversion of video signals, and standardization of digital interface is highly expected.

The DVI (Digital Visual Interface) is a digital interface standardized by the DDWG (Digital Display Working Group), whose digital data transmission system consists of total four-channel transmission lines, three-channel image data transmission lines (red, green, blue) and one-channel clock transmission line. Serial signals of each transmission line adopt TMDS (Transmission minimized Differential Signaling) which is a system using single-end differential signals.

FIGS. 11 and 12 are views showing connectors of DVI specification. The DVI specification includes two types, an interface supporting signals of only digital specification as shown in FIG. 11 and that supporting signals of both digital specification and analog specification as shown in FIG. 12. The former is called DVI-D and the latter is called DVI-I. According to the DVI specification, two signal lines are used for the DDC communication, one is an SDA line which is a bidirectional serial data line and the other is an SCL line used as a clock. Further, in the DVI specification, a communications protocol called DDC2B is used for the DDC communication.

When a computer requests the display monitor to transmit the EDID data through the seventh pin (SDA) and the sixth pin (SCL) of the DVI connector, the display monitor begins to transmit the EDID data to the computer through the seventh pin (SDA). Then, when the computer judges that the EDID data is sufficiently transmitted, the computer requests the display monitor to stop transmission of the EDID data and the display monitor, receiving the request, stops transmission of the EDID data.

In the case of DVI-I interface, as shown in FIG. 12, the input interface for the video signals has two systems, i.e., a digital channel and an analog channel, while the DDC line has only one system. In the display monitor of DVI-I specification, therefore, it is difficult to judge whether the EDID data of analog specification or the EDID data of digital specification should be transmitted in response to the transmission request of the EDID data from the computer.

As a method to solve the above problem, a user makes a selection in advance on whether the display monitor should be used as analog specification or digital specification. Then, as a display monitor having the DVI-I interface, one having a switcher which allows the user to determine whether the display monitor should be used as analog specification or digital specification has been conventionally proposed.

When the display monitor is used as analog specification, for example, the input channel of the interface and the EDID data to be transmitted through the DDC communication should be set for analog specification. On the other hand, when the display monitor is used as digital specification, the input channel of the interface and the EDID data to be transmitted through the DDC communication should be set for digital specification.

Further, when adjustment items of OSD (On Screen Display) are different between the analog specification and the digital specification (for example, the OSD of the display monitor of analog specification needs clock-phase adjustment items while the OSD of the display monitor of digital specification does not need), it is necessary to switch the OSD in accordance with the difference.

FIG. 13 is a view showing the switching of EDID data by a switcher of a display monitor of DVI-I connector specification in the background art. As shown in FIG. 13, the switcher is so provided on a DDC line as to establish an access to either EDID data of analog specification or EDID data of digital specification. The user makes a setting on whether the display monitor is used as analog specification or digital specification with the OSD or the like. For example, when the user selects the analog channel, the switcher so operates as to switch the line for an access to the side of the EDID data of analog specification and the when the user selects the digital channel, the switcher so operates as to switch the line for an access to the side of the EDID data of digital specification.

Further, though not shown, the switching of the input channel and the OSD is made in response to the switching by the switcher.

In the above method where the setting on whether to use the analog channel or the digital channel is made in advance, however, when the user makes a wrong setting or the computer connected to the display monitor or the setting of the computer is changed, for example, there is a possibility where analog signals are inputted though the display monitor is set for digital channel or digital signals are inputted though the display monitor is set for analog channel. Since the background-art display monitor can not accommodate such a case, there arises a problem that a correct display is not achieved due to mismatch of support timing or the like.

Further, among the computers capable of outputting digital video signals are ones which stop outputting of the digital video signals when the EDID data sent from the display monitor is not of digital specification, and when the display monitor in which the analog channel is selected by the method shown in FIG. 13 is connected to such computers, there arises a problem that the display monitor receives no video signal and therefore displays nothing.

Furthermore, in the display monitor, it is necessary to assume that the inputted video signals include ones of analog-only type such as D-sub connector input, ones of digital-only type such as DVI-D connector input and ones of mixed digital-and-analog type such as DVI-I connector input, depending on the output mode of the computer. That is because, for example, the computer which sends the video signals does not necessarily adopt DVI-I connector output even if the display monitor adopts the DVI-I connector input. For example, if the user uses a conversion cable or a conversion connector, it is possible to connect, e.g., the display monitor with DVI-I connector input to a computer with other output modes such as D-Sub connector output.

SUMMARY OF THE INVENTION

It is an object of the present invention is to provide an input channel switching control device which is capable of automatically make a correct setting of input channel, EDID data and the like in accordance with the specification of an input signal in a display monitor having a DDC function which includes a DVI-I connector.

The present invention is intended for an input channel switching control device for a display monitor having a DDC function which includes a DVI-I interface supporting respective video signals of analog specification and digital specification inputted from an external computer.

According to a first aspect of the present invention, the input channel switching control device for the display monitor includes discrimination means, EDID data memory means, input channel switching means and DDC control means. The discrimination means judges whether each of the video signals inputted from the external computer is a signal of analog specification or digital specification. The EDID data memory means stores EDID data of analog specification and EDID data of digital specification. The input channel switching means switches the state of an input channel into a channel of the specification of the video signal which is judged by the discrimination means. The DDC control means reads and transmits to the external computer the EDID data of the specification of the video signal which is judged by the discrimination means out from the EDID data memory means on the basis of a DDC transmission request from the external computer.

In the display monitor having the DDC function which includes the DVI-I interface, the transmit EDID data and the input channel of the display monitor are automatically switched to ones corresponding to the specification of the video signal outputted from the external computer, respectively.

It is therefore possible to avoid the mismatch of support timing and the problem that nothing is displayed on a screen, which are caused by the mismatch between the specification of the output signal from the computer and the input channel of the display monitor, and always achieve a correct display.

According to a second aspect of the present invention, the input channel switching control device for the display monitor includes discrimination means, EDID data memory means, input channel switching means and DDC control means. The discrimination means judges whether each of the video signals inputted from the external computer is a signal of analog specification or digital specification and also judges whether the state of an input channel is an analog channel or a digital channel. The EDID data memory means stores EDID data of analog specification and EDID data of digital specification. The input channel switching means switches the state of the input channel into a channel of the specification of the video signal which is judged by the discrimination means. The DDC control means reads and transmits to the external computer the EDID data of the specification corresponding to the state of the input channel which is judged by the discrimination means out from the EDID data memory means on the basis of a DDC transmission request from the external computer.

In the display monitor having the DDC function which includes the DVI-I interface, when the output mode of the computer has a DVI-I output, it is possible to make a selection on whether the display monitor should be used as analog specification or digital specification with higher priority given to the setting of the display monitor side. Further, when the display monitor is connected to a computer which is capable of outputting video signals of either analog specification or digital specification, it is possible to automatically make a correct setting of the input channel and the EDID data of the display monitor in accordance with the specification of the output signal.

Therefore, by properly switching the input channel and the EDID data with higher priority given to the channel setting of the display monitor, it is possible to avoid the mismatch of support timing and the problem that nothing is displayed on a screen, which are caused by the mismatch between the specification of the output signal from the computer and the input channel of the display monitor, and always achieve a correct display.

According to a third aspect of the present invention, the input channel switching control device for the display monitor includes discrimination means, EDID data memory means, input channel switching means, DDC control means and selection means. The discrimination means judges whether each of the video signals inputted from the external computer is a signal of analog specification or digital specification and also judges whether the state of an input channel is an analog channel or a digital channel. The EDID data memory means stores EDID data of analog specification and EDID data of digital specification. The input channel switching means switches the state of the input channel into a channel of the specification of the video signal which is judged by the discrimination means. The DDC control means reads and transmits to the external computer the EDID data of predetermined specification out from the EDID data memory means on the basis of a DDC transmission request from the external computer. The selection means can make a selection on whether the EDID data of the predetermined specification read out from the EDID data memory means by the DDC control means is the EDID data of the specification of the video signal which is judged by the discrimination means or the EDID data of the specification corresponding to the state of the input channel which is judged by the discrimination means.

When the output mode of the computer has a DVI-I output, it is possible to select whether high priority is given to the setting of the display monitor side or the specification of the video signal from the computer in making the selection on whether the display monitor should be used as analog specification or digital specification.

These and other objects, features, aspects and advantages of the present invention will become more apparent from the

BRIEF DESCRIPTION OF THE DRAWINGS

FIG. 3 is a view showing a constitution of an input channel switching control device for a display monitor in accordance with a second preferred embodiment of the present invention;

FIG. 7 is a view showing a constitution of an input channel switching control device for a display monitor in accordance with a fourth preferred embodiment of the present invention;

FIG. 11 is a view showing a connector of DVI-D specification;

FIG. 12 is a view showing a connector of DVI-I specification; and

FIG. 13 is a view showing the switching of channel by a switcher of a display monitor of DVI-I connector specification in the background art.

DESCRIPTION OF THE PREFERRED EMBODIMENTS

<The First Preferred Embodiment>

Figure 1:
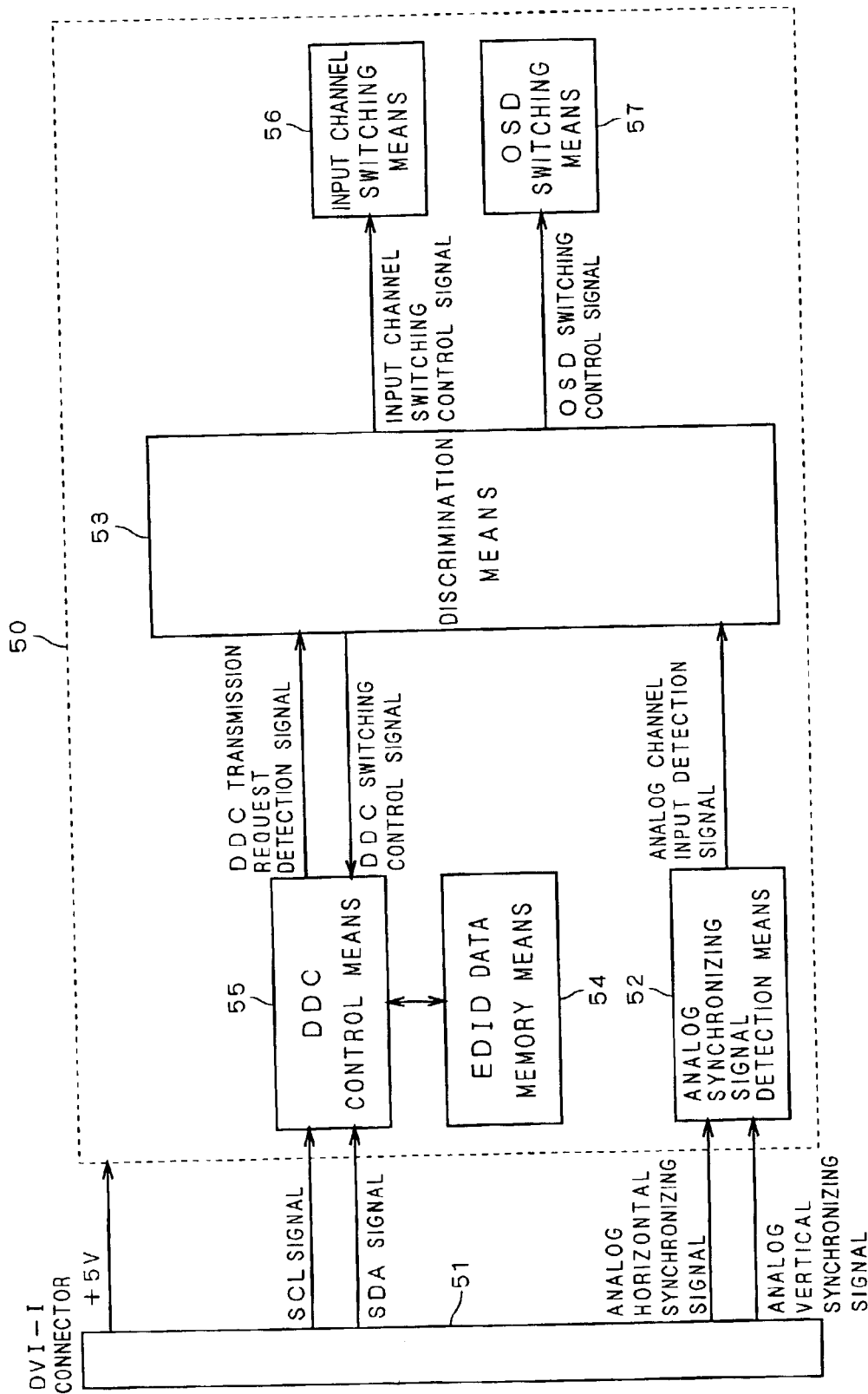
FIG. 1 is a view showing a constitution of an input channel switching control device for a display monitor in accordance with a first preferred embodiment of the present invention.

FIG. 1 is a view showing a constitution of an input channel switching control device 50 for a display monitor in accordance with the first preferred embodiment of the present invention. In FIG. 1, reference numeral 51 denotes a DVI-I connector supporting input signals of two systems of analog specification and digital specification, and a display monitor is connected to an external computer through the DVI-I connector 51. Reference numeral 52 denotes analog synchronizing signal detection means for detecting analog horizontal synchronizing signals and analog vertical synchronizing signals of the DVI-I connector 51. Since these analog horizontal synchronizing signals and analog vertical synchronizing signals are transmitted from the external computer only when the video signals are of analog specification, by monitoring these signals, it is possible to judge whether the video signals are of digital specification or analog specification from whether these signals are inputted or not. When the analog synchronizing signal detection means 52 detects the analog horizontal synchronizing signal and the analog vertical synchronizing signal, the means 52 outputs an analog channel input detection signal to discrimination means 53.

The discrimination means 53 judges whether the video signal is a signal of analog specification or digital specification on the basis of the analog channel input detection signal from the analog synchronizing signal detection means 52. In other words, in the first preferred embodiment, the analog synchronizing signal detection means 52 and the discrimination means 53 constitute means for judging whether the inputted video signal is a digital signal or an analog signal. The discrimination means 53 transmits a DDC switching control signal, an input channel switching control signal and an OSD switching control signal to DDC control means 55, input channel switching means 56 and OSD switching means 57, respectively, on the basis of the judgment result on the video signal.

Reference numeral 54 denotes nonvolatile EDID data memory means in which both EDID data of analog specification and EDID data of digital specification are stored. The DDC control means 55 performs DDC communication with the computer and when a DDC request signal is detected, the DDC control means 55 transmits a DDC transmission request detection signal to the discrimination means 53. Then, the DDC control means 55 is controlled to read the EDID data corresponding to the specification of the video signal from the EDID data memory means 54 on the basis of the DDC switching control signal from the discrimination means 53 and transmits the read EDID data to the computer.

The input channel switching means 56 is controlled by the input channel switching control signal from the discrimination means 53 to switch the input channel into a channel corresponding to the specification of the video signal. Further, the OSD switching means 57 is controlled by the OSD switching control signal from the discrimination means 53 to switch the OSD of the display monitor to one corresponding to the specification of the video signal judged by the discrimination means 53.

Figure 2:
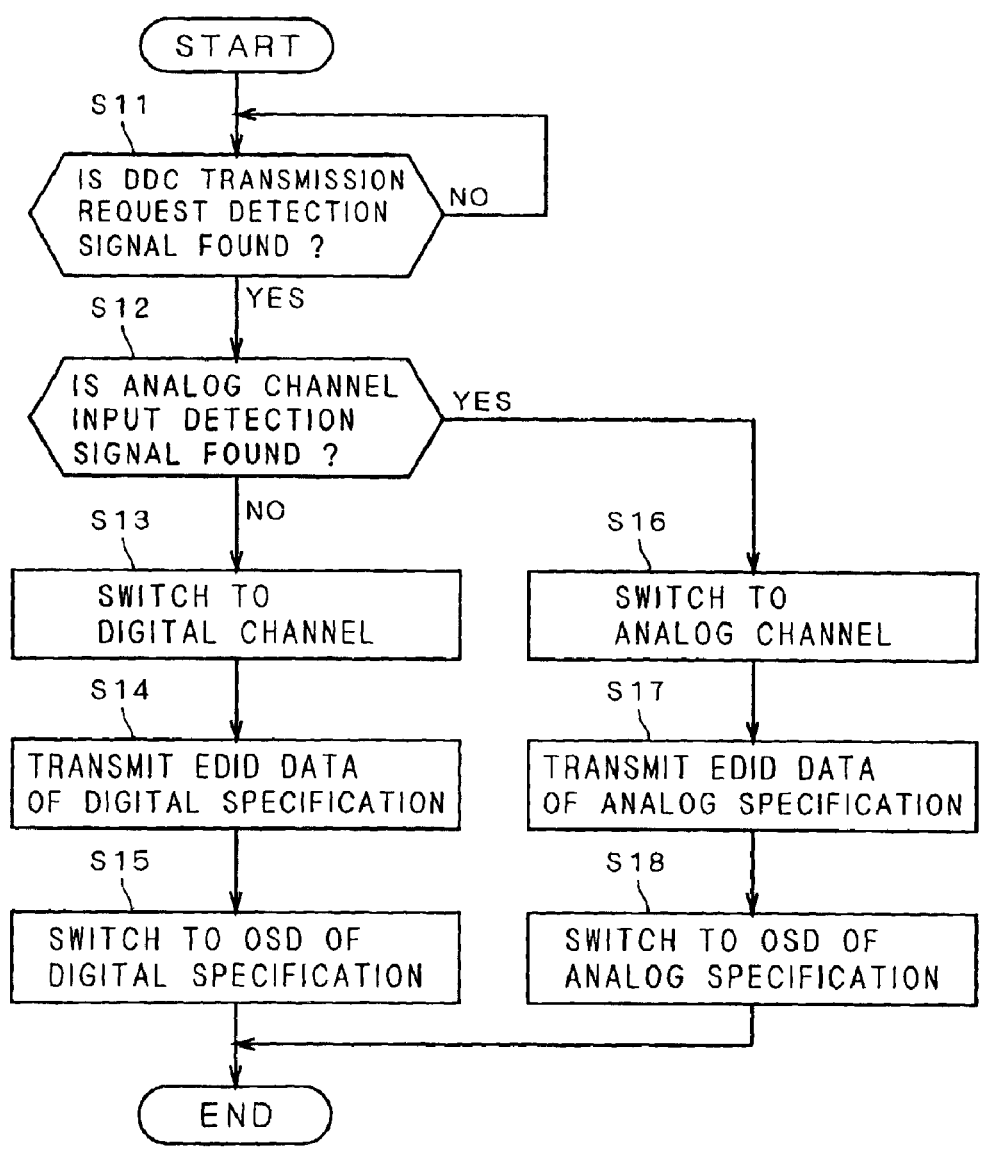
FIG. 2 is a flowchart showing an operation of the input channel switching control device for a display monitor in accordance with the first preferred embodiment of the present invention.

FIG. 2 is a flowchart showing an operation of the input channel switching control device for a display monitor in accordance with the first preferred embodiment of the present invention. Hereafter, the operation of the input channel switching control device of FIG. 1 will be discussed referring to FIG. 2.

The discrimination means 53 monitors whether the DDC transmission request is sent from the external computer by monitoring the DDC transmission request detection signal from the DDC control means 55 (S11). Then, when the DDC transmission request is found and the DDC transmission request detection signal is transmitted from the DDC control means 55 to the discrimination means 53, the discrimination means 53 subsequently detects the analog channel input detection signal from the analog synchronizing signal detection means 52 (S12).

When the analog channel input detection signal is not detected in the step S12 (in other words, when the inputted video signal is of digital specification), the discrimination means 53 controls the input channel switching means 56 to switch the input channel to a digital channel (S13). Further, the DDC control means 55 reads the EDID data of digital specification out from the EDID data memory means 54 on the basis of the control of the discrimination means 53 and transmits the data to the computer (S14). The OSD switching means 57 switches the OSD to one supporting digital specification (S15).

Furthermore, when the analog channel input detection signal is detected in the step S12 (in other words, when the inputted video signal is of analog specification), the discrimination means 53 controls the input channel switching means 56 to switch the input channel to an analog channel (S16). Further, the DDC control means 55 reads the EDID data of analog specification out from the EDID data memory means 54 on the basis of the control of the discrimination means 53 and transmits the data to the computer (S17). The OSD switching means 57 switches the OSD to one supporting analog specification (S18).

In short, according to the input channel switching control device 50 of the first preferred embodiment, in the display monitor supporting the DVI-I connector specification, when the signal outputted from the computer is one of digital specification, the transmit EDID data, the input channel, the OSD of the display monitor are all set to support the digital specification automatically and on the other hand, when the signal outputted from the computer is one of analog specification, these are all set to support the analog specification automatically.

In other words, the transmit EDID data, the input channel, the OSD of the display monitor are automatically switched to ones supporting the specification of the signal outputted from the computer.

It thereby becomes possible to avoid the mismatch of support timing and the problems that the adjustment items of OSD are different (for example, the OSD of analog channel needs clock-phase adjustment items while the OSD of digital channel does not need) and that nothing is displayed on a screen, which are caused by the mismatch between the specification of the output signal from the computer and the input channel of the display monitor.

<The Second Preferred Embodiment>

As discussed above, in the first preferred embodiment, the transmit EDID data, the input channel, the OSD of the display monitor are automatically switched to ones supporting the specification of the signal outputted from the computer.

In a case where the computer also has an interface of DVI-I specification as a signal output interface, the computer can output signals of both analog specification and digital specification as a video signal.

For example, when a display monitor of analog specification is connected to a computer having an output interface of DVI-I specification, the computer can output a signal of analog specification and when a display monitor of digital specification is connected to the computer, the computer can output a signal of digital specification.

That is, when the background-art display monitor shown in FIG. 13 is connected to the computer, the specification of the output signal from the computer depends on the state of the switcher of the display monitor. Specifically, in connection with the computer, when the switcher of the display monitor selects the analog side, the output signal of the computer is switched to a signal of analog specification and on the other hand, when the switcher of the display monitor selects the digital side, the output signal of the computer is switched to a signal of digital specification. In short, the specification of the video signal can be selected on the display monitor side.

In the display monitor of the first preferred embodiment, however, since the input channel and the like are forcedly switched depending on the specification of the output signal from the computer, the specification of the video signal can not be selected as above on the display monitor side.

Then, in the second preferred embodiment proposed is an input channel switching control device in which the output signal from the computer can be selected on the display monitor side when the computer has an output interface of DVI-I specification and otherwise a correct setting of the input channel, the EDID data, the OSD and the like of the display monitor can be automatically made.

FIG. 3 is a view showing a constitution of an input channel switching control device 60 for a display monitor in accordance with the second preferred embodiment of the present invention. In FIG. 3, reference numeral 61 denotes discrimination means for judging whether the video signal inputted from the computer connected to the DVI-I connector 51 is a signal of analog specification or digital specification and judging the state of the input channel. The judgment on the video signal by the discrimination means 61 is based on the analog channel input detection signal from the analog synchronizing signal detection means 52 and the judgment on the state of the input channel is based on input channel state information stored in an EEPROM or the like of the input channel switching means 56. Detailed description on other constituent elements shown in FIG. 3 will be omitted since these elements are the same as those of FIG. 1 represented by the same reference signs.

The discrimination means 61 transmits the DDC switching control signal, the input channel switching control signal and the OSD switching control signal to the DDC control means 55, the input channel switching means 56 and the OSD switching means 57, respectively, on the basis of the judgment result on whether the video signal is of analog specification or digital specification and the judgment result on the state of the input channel.

In the second preferred embodiment, unlike in the first preferred embodiment, the DDC control means 55 is controlled by the DDC switching control signal from the discrimination means 61 to read the EDID data of the specification corresponding to the current state of the input channel out from the EDID data memory means 54. Further, the input channel switching means 56 and the OSD switching means 57 are controlled by the input channel switching control signal and the OSD switching control signal, respectively, to switch the input channel and the OSD to ones corresponding to the specification of the video signal, like in the first preferred embodiment.

Figure 4:
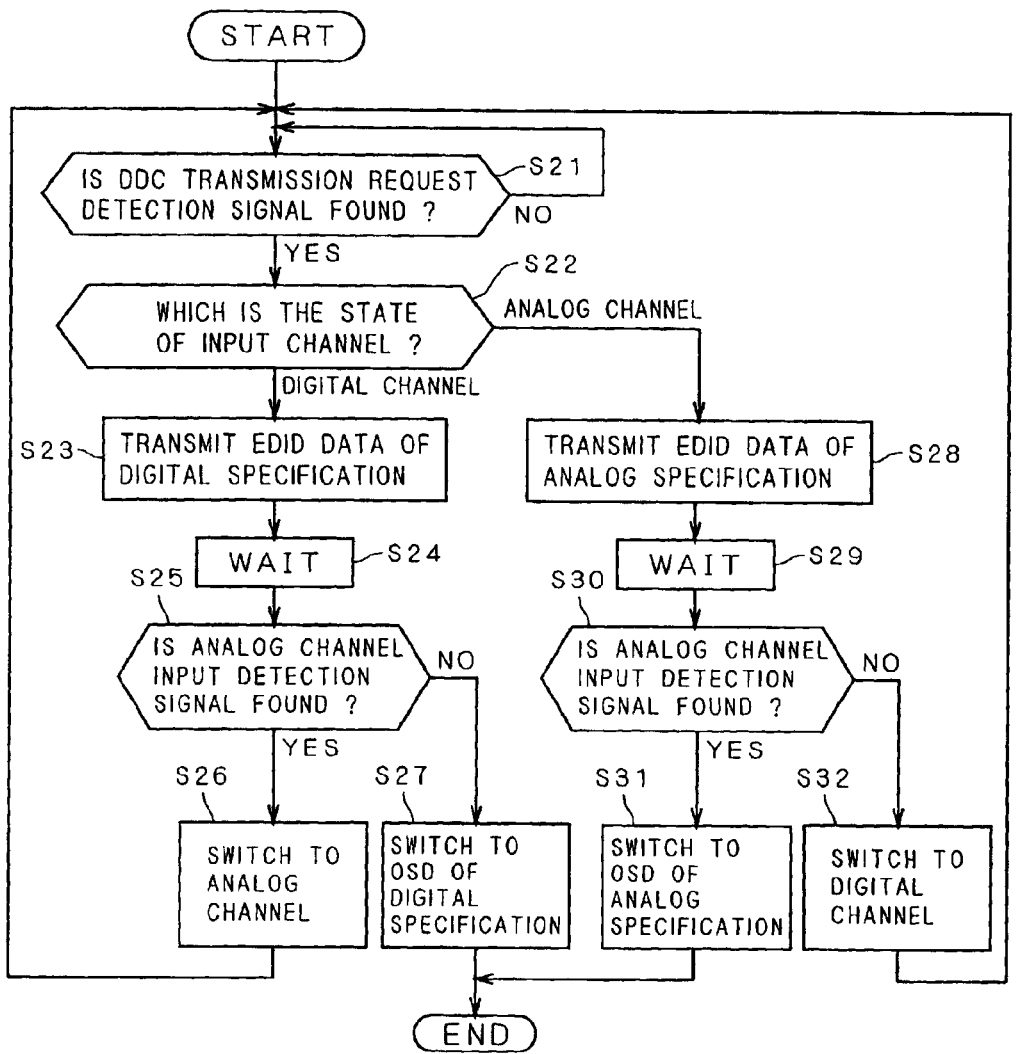
FIG. 4 is a flowchart showing an operation of the input channel switching control device for a display monitor in accordance with the second preferred embodiment of the present invention.

FIG. 4 is a flowchart showing an operation of the input channel switching control device 60 for a display monitor in accordance with the second preferred embodiment of the present invention. Hereafter, the operation of the input channel switching control device of FIG. 3 will be discussed referring to FIG. 4.

It is herein assumed that D-Sub specification capable of outputting signals of only analog specification and DVI-D specification capable of outputting signals of only digital specification, for example, besides the DVI-I specification capable of outputting signals of both analog specification and digital specification may be used as the specification of the output interface of the computer connected to the display monitor. The following table shows grouping of cases discussed below, and it is assumed that there are six cases, cases 1 to 6, by combination of the output mode of the computer connected to the display monitor and the initial state of the input channel of the display monitor (set by a user when the computer and the display monitor are connected).

TABLE 1

| Initial State of Input Channel | Output Mode of Computer | | |
|---|---|---|---|
| of Display Monitor | DFP, DVI-D | DVI-I | D-Sub |
| Digital Channel | Case 1 | Case 3 | Case 5 |
| Analog Channel | Case 2 | Case 4 | Case 6 |

As discussed above, in the second preferred embodiment, the output signal from the computer can be selected on the display monitor side when the computer has an output interface of DVI-I specification and otherwise a correct setting of the input channel, the EDID data, the OSD and the like of the display monitor can be automatically made. In other words, the display monitor is set for digital specification in the cases 1 to 3 and set for analog specification in the cases 4 to 6.

First, the operation in the case 1 will be discussed. The discrimination means 61 monitors whether the DDC transmission request is sent from the computer by detecting the DDC transmission request detection signal from the DDC control means 55 (S21). Then, when the DDC transmission request from the computer is found, the discrimination means 61 judges the current state of the input channel of the display monitor (S22). In the case 1, since the initial setting of the input channel is a digital channel, the DDC control means 55 reads the EDID data of digital specification out from the EDID data memory means 54 on the basis of the control of the discrimination means 61 and transmits the data to the computer (S23). Then, the discrimination means 61 waits for a predetermined time until the response to the DDC transmission is given from the computer (S24) and after that, the discrimination means 61 detects the analog channel input detection signal from the analog synchronizing signal detection means 52 (S25). In this case 1, since the output mode of the computer is DFP or DVI-D for outputting signals of only digital specification and no analog channel input detection signal is detected, the discrimination means 61 controls the OSD switching means 57 to switch the OSD into one of digital specification (S27). Thus, in the case 1, the input channel, the EDID data and the OSD are set for digital specification.

Next, the operation in the case 2 will be discussed. When the DDC transmission request from the computer is detected in the step S21, the discrimination means 61 judges the current state of the input channel of the display monitor in the step S22. In the case 2, since the initial setting of the input channel is an analog channel, the DDC control means 55 reads the EDID data of analog specification out from the EDID data memory means 54 on the basis of the control of the discrimination means 61 and transmits the data to the computer (S28). Then, the discrimination means 61 waits for a predetermined time until the response to the DDC transmission is given from the computer (S29) and after that, the discrimination means 61 detects the analog channel input detection signal from the analog synchronizing signal detection means 52 (S30). In this case 2, since the output mode of the computer is only digital specification and no analog channel input detection signal is detected, the input channel is switched into a digital channel (S32) and the procedure goes back to the step S21. Though the DDC transmission request made at the system startup is generally performed more than one time and the DDC transmission request is detected again, the input channel at this time is a digital channel, in other words, the state transits to that of the case 1. Therefore, after that, the same operation as in the case 1 is performed to set the input channel, the EDID data and the OSD for digital specification.

Next, the operation in the case 3 will be discussed. When the DDC transmission request from the computer is detected in the step S21, the discrimination means 61 judges the current state of the input channel of the display monitor in the step S22. In the case 3, since the initial setting of the input channel is a digital channel, the DDC control means 55 reads the EDID data of digital specification out from the EDID data memory means 54 on the basis of the control of the discrimination means 61 and transmits the data to the computer (S23). Then, the discrimination means 61 waits for a predetermined time until the response to the DDC transmission is given from the computer (S24) and after that, the discrimination means 61 detects the analog channel input detection signal from the analog synchronizing signal detection means 52 (S25). In this case 3, though the output mode of the computer is DVI-I specification supporting both digital specification and analog specification, no analog channel input detection signal is detected since the computer which receives the EDID data of digital specification in the step S23 outputs a signal of digital specification, and the OSD is switched into one of digital specification (S27). Thus, in the case 3, the input channel, the EDID data and the OSD are set for digital specification.

Next, the operation in the case 4 will be discussed. When the DDC transmission request from the computer is detected in the step S21, the discrimination means 61 judges the current state of the input channel of the display monitor in the step S22. In the case 4, since the initial setting of the input channel is an analog channel, the DDC control means 55 reads the EDID data of analog specification out from the EDID data memory means 54 on the basis of the control of the discrimination means 61 and transmits the data to the computer (S28). Then, the discrimination means 61 waits for a predetermined time until the response to the DDC transmission is given from the computer (S29) and after that, the discrimination means 61 detects the analog channel input detection signal from the analog synchronizing signal detection means 52 (S30). In this case 4, though the output mode of the computer is DVI-I specification supporting both digital specification and analog specification, the analog channel input detection signal is detected since the computer which receives the EDID data of analog specification in the step S28 outputs a signal of analog specification, and the OSD is switched into one of analog specification (S31). Thus, in the case 4, the input channel, the EDID data and the OSD are set for analog specification.

Herein, the operation in the case 6 will be discussed before discussion of the case 5, for convenience. When the DDC transmission request from the computer is detected in the step S21, the discrimination means 61 judges the current state of the input channel of the display monitor in the step S22. In the case 6, since the initial setting of the input channel is an analog channel, the DDC control means 55 reads the EDID data of analog specification out from the EDID data memory means 54 on the basis of the control of the discrimination means 61 and transmits the data to the computer (S28). Then, the discrimination means 61 waits for a predetermined time until the response to the DDC transmission is given from the computer (S29) and after that, the discrimination means 61 detects the analog channel input detection signal from the analog synchronizing signal detection means 52 (S30). In this case 6, since the output mode of the computer is D-Sub specification supporting only analog specification and the computer outputs a signal of analog specification, the analog channel input detection signal is detected and the OSD is switched into one of analog specification (S31). Thus, in the case 6, the input channel, the EDID data and the OSD are set for analog specification.

Finally, the operation in the case 5 will be discussed. When the DDC transmission request from the computer is detected in the step S21, the discrimination means 61 judges the current state of the input channel of the display monitor in the step S22. In the case 5, since the initial setting of the input channel is a digital channel, the DDC control means 55 reads the EDID data of digital specification out from the EDID data memory means 54 on the basis of the control of the discrimination means 61 and transmits the data to the computer (S23). Then, the discrimination means 61 waits for a predetermined time until the response to the DDC transmission is given from the computer (S24) and after that, the discrimination means 61 detects the analog channel input detection signal from the analog synchronizing signal detection means 52 (S25). In this case 5, since the output mode of the computer is D-Sub specification supporting only analog specification and the computer outputs a signal of analog specification though it receives the EDID data of digital specification in the step S23, the analog channel input detection signal is detected and the input channel is switched into an analog channel (S26) and the procedure goes back to the step S21. Though the DDC transmission request made at the system startup is generally performed more than one time and the DDC transmission request is detected again, the input channel at this time is an analog channel, in other words, the state transits to that of the case 6. Therefore, after that, the same operation as in the case 6 is performed to set the input channel, the EDID data and the OSD for analog specification.

As discussed above, according to the input channel switching control device for a display monitor of the second preferred embodiment, in the display monitor supporting the DVI-I connector specification, when the output mode of the computer has the DVI-I output, it is possible to make a selection on whether the display monitor should be used as analog specification or digital specification with higher priority given to the setting of the display monitor side. Further, when the display monitor is connected to a computer which is capable of outputting video signals of either analog specification or digital specification, it is possible to automatically make a correct setting of the input channel, the EDID data, the OSD and the like of the display monitor in accordance with the specification of the output signal, like in the first preferred embodiment.

In other words, it thereby becomes possible to avoid the mismatch of support timing and the problems that the adjustment items of OSD are different (for example, the OSD of analog channel needs clock-phase adjustment items while the OSD of digital channel does not need) and that nothing is displayed on a screen, which are caused by the mismatch between the specification of the output signal from the computer and the input channel of the display monitor, with higher priority given to the channel setting of the display monitor.

<The Third Preferred Embodiment>

In the display monitor having the DVI-I connector, when a user switches the input channel of the display monitor by the OSD or the like during use of the computer and the display monitor, a correct display is not made due to mismatch of support timing or the like. In this case, in order to make the DDC communication again, there arises necessity to reset the computer or make connection between the display monitor and the computer again. In the second preferred embodiment, for example, though high priority is given to the setting of the display monitor, this problem makes it impossible to switch the channel during use of the display monitor.

Figure 5:
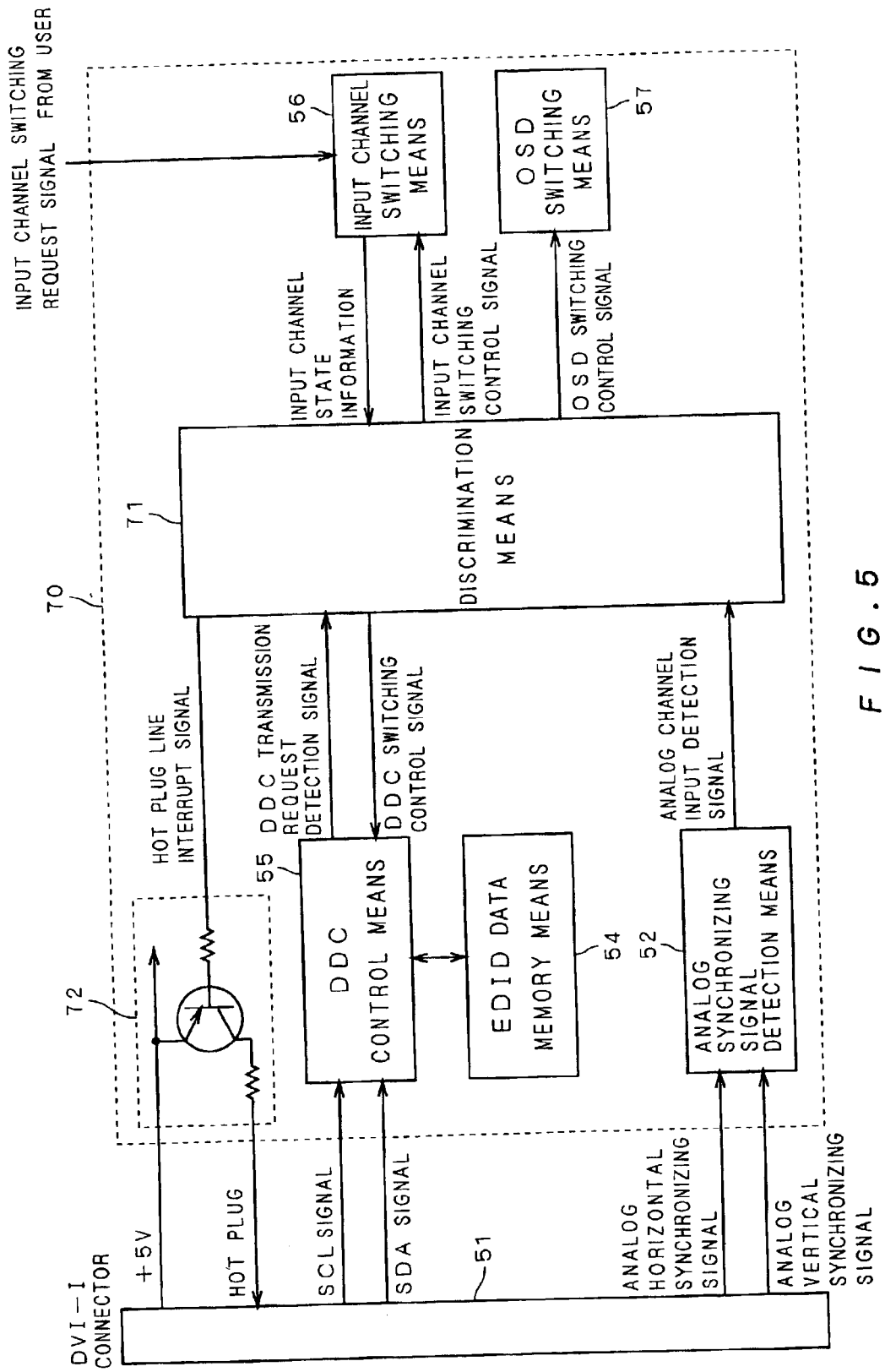
FIG. 5 is a view showing a constitution of an input channel switching control device for a display monitor in accordance with a third preferred embodiment of the present invention.

FIG. 5 is a view showing a constitution of an input channel switching control device 70 for a display monitor in accordance with the third preferred embodiment of the present invention. In FIG. 5, reference numeral 71 denotes discrimination means for judging whether the video signal inputted from the computer connected to the DVI-I connector 51 is a signal of analog specification or digital specification and judging the state of the input channel. Further, reference numeral 72 denotes hot plug line interrupt means for switching between a +5V-terminal and a hot plug terminal of the DVI-I connector 51, which is controlled by a hot plug line interrupt signal from the discrimination means 71. Detailed description on other constituent elements shown in FIG. 5 will be omitted since these elements are the same as those of FIG. 3 represented by the same reference signs.

The discrimination means 71 can detect the switching of the input channel by judging the state of the input channel and when the switching of the input channel is detected, the discrimination means 71 turns off the hot plug line interrupt means 72 by bringing the hot plug line interrupt signal into high level for a predetermined time and opens a hot plug line of the DVI-I connector 51 to bring the hot plug line which is pulled up to +5 V until then into low level.

Figure 6:
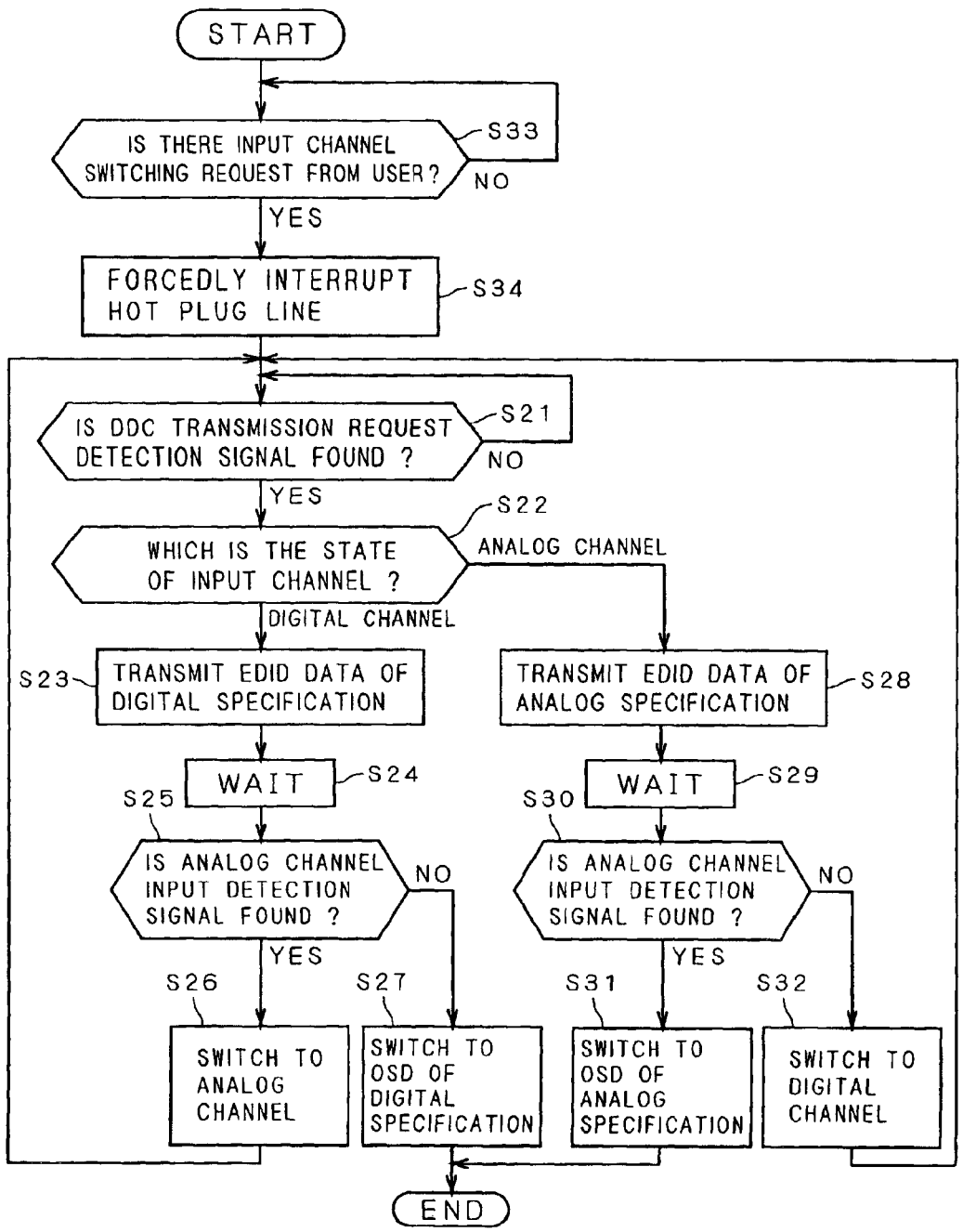
FIG. 6 is a flowchart showing an operation of the input channel switching control device for a display monitor in accordance with the third preferred embodiment of the present invention.

FIG. 6 is a flowchart showing an operation of the input channel switching control device 70 for a display monitor in accordance with the third preferred embodiment of the present invention. Hereafter, the operation of the input channel switching control device of FIG. 5 will be discussed referring to FIG. 6.

First, the discrimination means 71 judges whether the input channel is switched or not by monitoring the state of the input channel of the display monitor (S33). At this time, when a user requests switching of the input channel of the display monitor through the OSD, the input channel switching means 56 receives an input channel switching request signal and switches the state of the input channel. The discrimination means 71, detecting the switching from the change of the state of the input channel, turns off the hot plug line interrupt means 72 for a predetermined time and opens the hot plug line of the DVI-I connector 51 to bring the hot plug line which is pulled up to +5 V until then into low level (S34).

Usually, since the hot plug line is electrically connected to the +5V-terminal through a resistor on the display monitor side, the hot plug line is pulled up to +5 V by connecting the computer to the display monitor. The computer side recognizes connection with the display monitor from the level of the hot plug line and sends the DDC transmission request to the display monitor.

In other words, when the hot plug line of the DVI-I connector 51 is opened by turning off the hot plug line interrupt means 72 and brought into low level, this state is equivalent to a state where a connector of the display monitor is pulled out from the viewpoint of the computer. After the predetermined time, when the hot plug line interrupt means 72 is turned on and the hot plug line is pulled up to +5 V again, a graphic chip on the computer side is interrupted and the computer, judging that the display monitor is connected thereto, sends the DDC transmission request to the display monitor. Therefore, it is possible to allow the computer to send the DDC transmission request without resetting the computer or reconnecting the display monitor to the computer.

Further, discussion on the operation after the step S34 is omitted since it is the same as that discussed in the second preferred embodiment referring to FIG. 4.

As discussed above, according to the input channel switching control device for a display monitor of the third preferred embodiment, in the display monitor supporting the DVI-I connector specification, it is possible to make a selection on whether the display monitor should be used as analog specification or digital specification with higher priority given to the setting of the display monitor side, and when the user switches the input channel during use of the display monitor, it is possible to allow the computer to send the DDC transmission request without resetting the computer or reconnecting the display monitor to the computer. In other words, even when the user switches the input channel during use of the display monitor, it is possible to perform such an operation as to maintain consistency in display mode.

<The Fourth Preferred Embodiment>

In the input channel switching control device for a display monitor of the third preferred embodiment, a normal display can not made while the switching of the input channel is performed in response to the input channel switching request from the user. Therefore, among possible methods to avoid irregularity in screen display are to perform blanking of a display screen or to freeze a display image to the state before the switching of the input channel in the display monitor having a frame memory, during the switching of the input channel.

In the third preferred embodiment, however, the input channel switching request signal from the user is directly inputted to the input channel switching means as shown in FIG. 5. Specifically, the switching of the input channel by the input channel switching means is forcedly performed at any timing when the user gives the input channel switching request, not at a timing in synchronization with scanning of the display monitor. Therefore, depending on the timing, irregularity sometimes occurs in the screen display of the display monitor before the blanking or the image freeze performed simultaneously with the switching of the input channel. Then, though it is possible to perform the blanking or the image freeze in advance when the input channel is switched, this lengthens the time period for the blanking of the screen or the image freeze.

FIG. 7 is a view showing a constitution of an input channel switching control device 75 for a display monitor in accordance with the fourth preferred embodiment of the present invention. In FIG. 7, reference numeral 76 denotes discrimination means for judging whether the video signal inputted from the computer connected to the DVI-I connector 51 is a signal of analog specification or digital specification, judging the state of the input channel and judging whether the display monitor is in a vertical retrace interval or not. Detailed description on other constituent elements shown in FIG. 7 will be omitted since these elements are the same as those of FIG. 5 represented by the same reference signs.

The irregularity in the screen display which occurs when the blanking or the image freeze is performed simultaneously with the switching of the input channel as discussed above is caused by the switching of the input channel performed during an image display period, i.e., a vertical scanning period of the display monitor. In other words, it is possible to suppress the irregularity of the display screen by performing the switching of the input channel at the timing of the retrace interval of the display monitor.

The judgment on whether the display monitor is in the vertical retrace interval or not can be made by detecting a signal in synchronization with the vertical scanning of the display monitor, e.g., a vertical synchronizing signal generated inside the display monitor (hereinafter, referred to as "vertical internal-synchronization signal"), and the discrimination means 76 judges whether the display monitor is in the vertical retrace interval or not on the basis of the vertical internal-synchronization signal.

Further, as shown in FIG. 7, the input channel switching request signal from the user is inputted to the discrimination means 76. The discrimination means 76 controls the input channel switching means 56 to switch the input channel in response to the input channel switching request signal from the user, and at that time, the switching of the input channel is performed at the timing of the vertical retrace interval of the display monitor. Therefore, it is possible to suppress the irregularity of the screen in performing the blanking or the image freeze simultaneously with the switching of the input channel.

Figure 8:
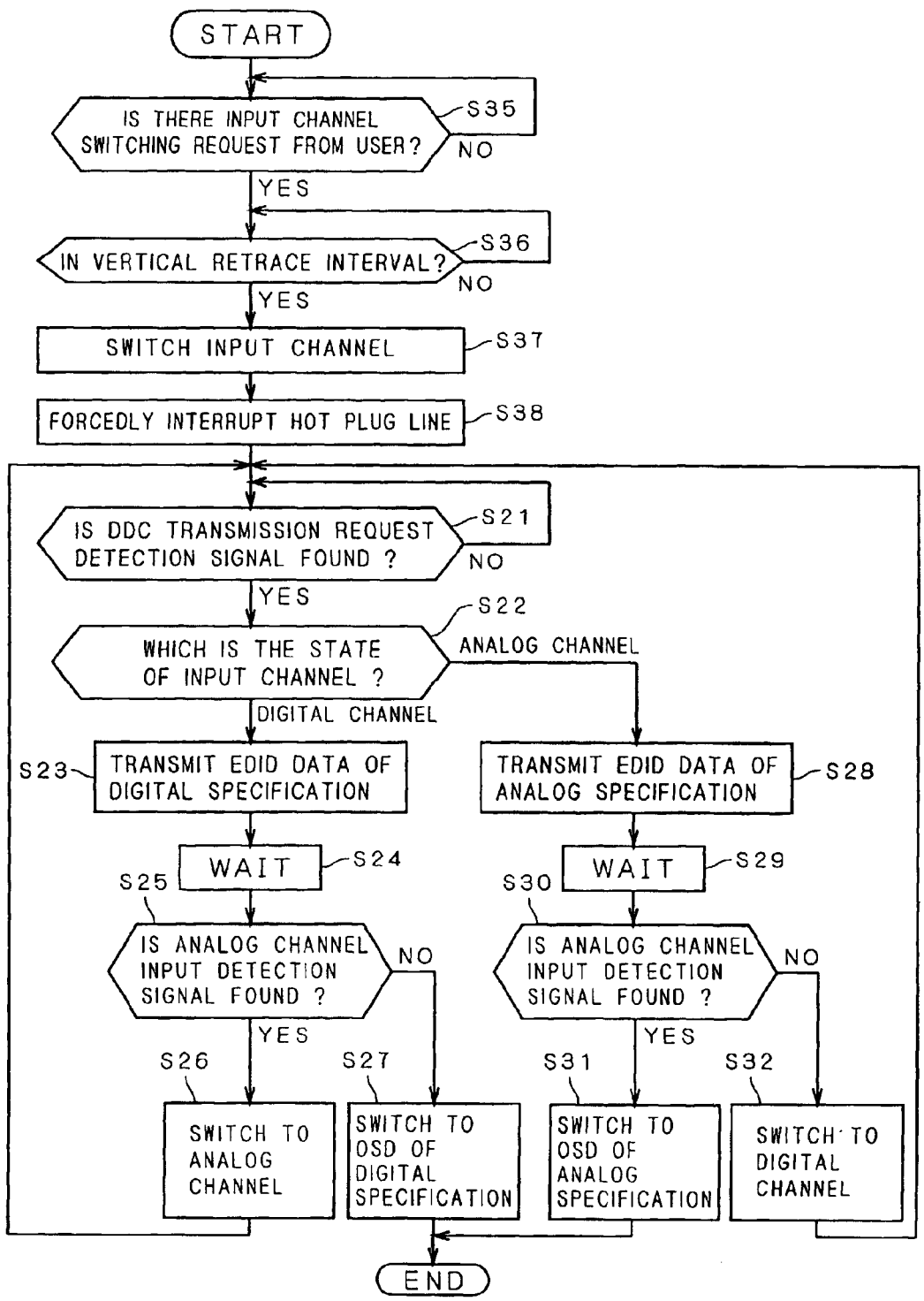
FIG. 8 is a flowchart showing an operation of the input channel switching control device for a display monitor in accordance with the fourth preferred embodiment of the present invention.

FIG. 8 is a flowchart showing an operation of the input channel switching control device 75 for a display monitor in accordance with the fourth preferred embodiment of the present invention. Hereafter, the operation of the input channel switching control device of FIG. 7 will be discussed referring to FIG. 8.

First, the discrimination means 76 judges whether the input channel switching request is given by the user or not by monitoring the input of the input channel switching request signal from the user (S35). At this time, when the user requests switching of the input channel of the display monitor through the OSD, for example, the input channel switching request signal is inputted to the discrimination means 76 and the discrimination means 76 detects the signal. At that time, the discrimination means 76 judges whether the display monitor is in the vertical retrace interval or not on the basis of the vertical internal-synchronization signal of the display monitor (S36). Then, the input channel is switched at the timing of the vertical retrace interval on the basis of the judgment result of the step S36 (S37). Further, the discrimination means 76 turns off the hot plug line interrupt means 72 for a predetermined time and opens the hot plug line of the DVI-I connector 51 to bring the hot plug line which is pulled up to +5 V until then into low level (S38).

Further, discussion on the operation after the step S38 is omitted since it is the same as that discussed in the second preferred embodiment referring to FIG. 4.

Thus, in the fourth preferred embodiment, since the switching of the input channel by the request of the user is performed at the timing of the vertical retrace interval of the display monitor, no irregularity occurs in the screen display even if the blanking of the screen or the image freeze in switching the input channel is performed simultaneously with the switching of the input channel. In other words, it is possible to suppress the irregularity in the screen display without lengthening the period for the blanking or the image freeze.

Further, though the judgment by the discrimination means 76 on whether the display monitor is in the retrace interval or not is based on the vertical internal-synchronization signal generated in the display monitor in FIG. 7, this judgment can be based on other signals in synchronization with the vertical scanning of the display monitor and the same effect can be produced.

<The Fifth Preferred Embodiment>

When the output mode of the computer is DVI-I specification, there are two possible algorithms, one with high priority given to the output setting of the computer as shown in the first preferred embodiment and the other with high priority given to the setting of the display monitor as shown in the second preferred embodiment. In the fifth preferred embodiment proposed is an input channel switching control device which allows a user to select the algorithm for channel switching.

Figure 9:
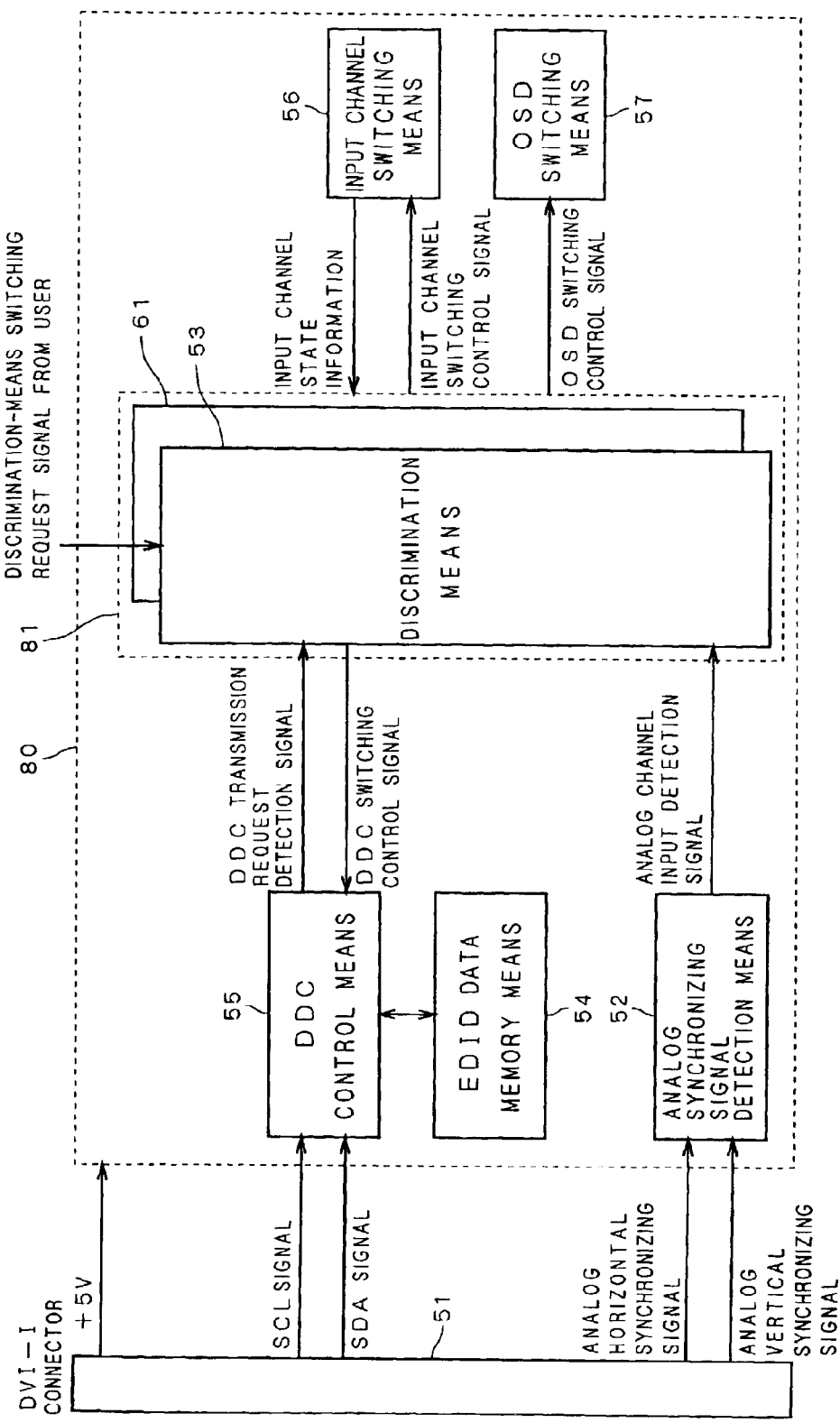
FIG. 9 is a view showing a constitution of an input channel switching control device for a display monitor in accordance with a fifth preferred embodiment of the present invention.

FIG. 9 is a view showing a constitution of an input channel switching control device 80 for a display monitor in accordance with the fifth preferred embodiment of the present invention. The input channel switching control device 80 includes the discrimination means 53 having a judgment algorithm discussed referring to the flowchart of FIG. 2 and the discrimination means 61 having a judgment algorithm discussed referring to the flowchart of FIG. 4. Either the discrimination means 53 or the discrimination means 61 is selected by a discrimination-means switching request signal from the user. Specifically, selection means 81 switches between the discrimination means 53 and the discrimination means 61 to make a selection on whether the specification of the EDID data read out from the EDID data memory means 54 by the DDC control means 55 should be the specification corresponding to the state of the input channel or the specification of the video signal. Detailed description on other constituent elements shown in FIG. 9 will be omitted since these elements are the same as those of FIG. 1 represented by the same reference signs.

The user sends the discrimination-means switching request signal to the discrimination means 81 through the OSD or the like to select one of the discrimination means 53 and 61. When the output mode of the computer is the DVI-I specification, particularly, the channel is forcedly switched to the specification of the output signal of the computer if the discrimination means 53 is used and on the other hand, it is possible to select the output of the computer in accordance with the current input channel of the display monitor if the discrimination means 61 is used.

In short, according to the input channel switching control device for a display monitor of the fifth preferred embodiment, when the output mode of the computer is the DVI-I specification, the user can select whether high priority is given to the output setting of the computer or the setting of the display monitor.

Further, though two discrimination means, i.e., the discrimination means 53 having the judgment algorithm discussed referring to the flowchart of FIG. 2 and the discrimination means 61 having the judgment algorithm discussed referring to the flowchart of FIG. 4, are shown as a plurality of discrimination means having different judgment algorithms in the fifth preferred embodiment, it is obviously possible to easily apply the fifth preferred embodiment to any discrimination means having other algorithms.

<Variation>

In the above preferred embodiments shown are cases where the judgment by the discrimination means on whether the video signal from the external computer is a signal of analog specification or digital specification is based on whether the analog horizontal synchronizing signal and the analog vertical synchronizing signal inputted from the DVI-I connector are detected or not. In other words, the basis for judgment is whether a signal of analog specification is inputted or not and it is judged that a signal of digital specification is inputted when no analog signal is inputted.

The method for judging the specification of the video signal by the discrimination means in the present invention, however, is not limited to the above judgment method, and for example, the basis for judgment may be whether a signal of digital specification is inputted or not. An exemplary case will be shown below.

Figure 10:
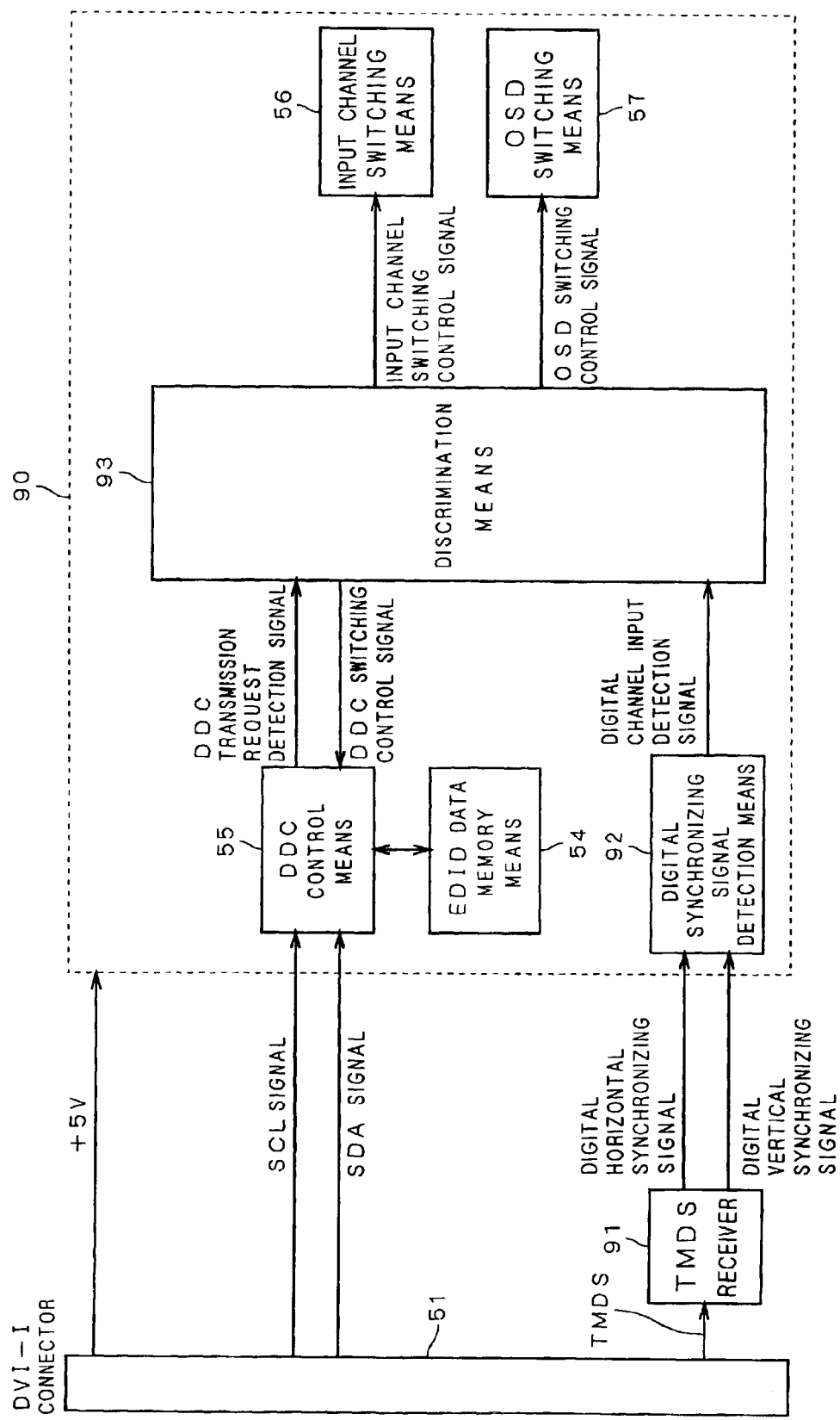
FIG. 10 is a view showing a variation of the input channel switching control device for a display monitor in accordance with the first preferred embodiment of the present invention.
Figure 1:
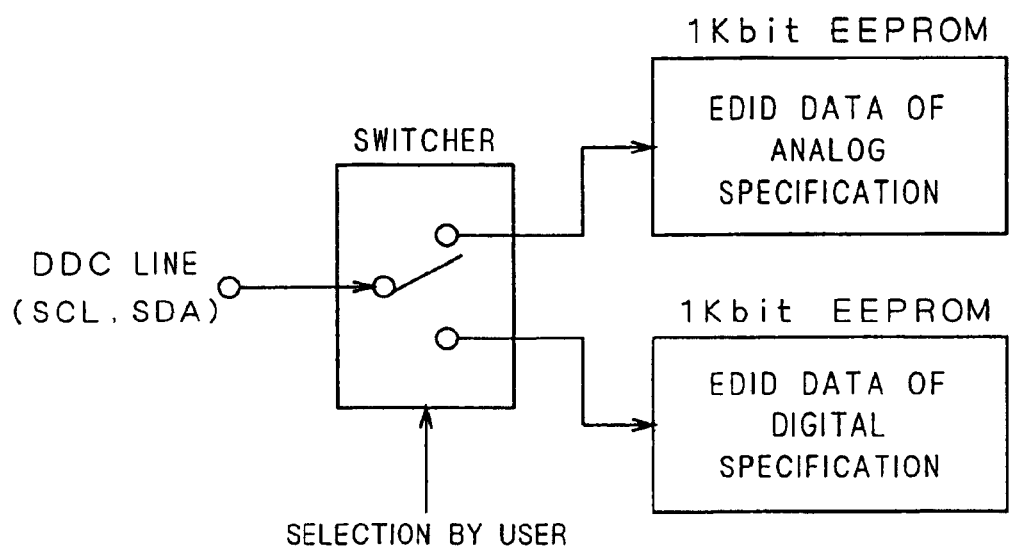

FIG. 10 is a view showing a variation of the input channel switching control device for a display monitor in accordance with the first preferred embodiment of the present invention, where the judgment by the discrimination means on the specification of the video signal from the external computer is based on whether a signal of digital specification is inputted or not. In FIG. 10, constituent elements identical to those of FIG. 1 are given the same reference signs and detailed description thereon will be herein omitted.

Reference numeral 90 denotes an input channel switching control device for a display monitor in accordance with the present variation. Reference numeral 91 denotes a TMDS (Transmission minimized Differential Signaling) receiver, for demodulating video signals, audio signals, horizontal synchronizing signals, vertical synchronizing signals and the like and extracting these signals from the TMDS signals which are signals of digital specification inputted from the DVI-I connector 51. Reference numeral 92 denotes digital synchronizing signal detection means for outputting a digital channel input detection signal to discrimination means 93 when the horizontal synchronizing signal and the vertical synchronizing signal of digital specification extracted by the TMDS receiver 91 are detected. The discrimination means 93 has the same function as the discrimination means 53 shown in FIG. 1, but judges whether the video signal is of analog specification or digital specification on the basis of the digital channel input detection signal from the digital synchronizing signal detection means 92.

Since the digital horizontal synchronizing signal and the digital vertical synchronizing signal extracted by the TMDS receiver 91 are obtained only when the video signal from the external computer is of digital specification, by monitoring these signals, it is possible to judge whether the video signal is a signal of digital specification or analog specification from whether these signals are found or not. The digital synchronizing signal detection means 92 outputs the digital channel input detection signal to the discrimination means 93 when detects the digital horizontal synchronizing signal and the digital vertical synchronizing signal. Then, the discrimination means 93 judges the specification of the video signal on the basis of the digital channel input detection signal, and in accordance with the judgment result, the same operation as in the first preferred embodiment is performed.

That is, in the present constitution, the judgment by the discrimination means 93 on whether the video signal inputted from the external computer is a signal of analog specification or digital specification is based on whether a signal of digital specification is inputted or not. In this case, when the digital signal is not inputted, it is judged that an analog signal is inputted.

Thus, the judgment on the specification of the video signal can be performed on the basis of whether a signal of digital specification is inputted or not. Further, it is obviously possible to produce the same effect as the case where the judgment is based on whether a signal of analog specification is inputted or not.

Furthermore, by detecting horizontal synchronizing signals and vertical synchronizing signals of both analog specification and digital specification, it is obviously possible to judge the specification of the video signal on the basis of these signals. In this case, the judgment on the specification of the video signal can be achieved more correctly.

Though the variation of the first preferred embodiment is herein shown, it is needless to say that this variation, i.e., the case where the judgment by the discrimination means on the specification of the video signal is based on whether a signal of digital specification is inputted or not, can be applied to the other preferred embodiments discussed above.

While the invention has been shown and described in detail, the foregoing description is in all aspects illustrative and not restrictive. It is therefore understood that numerous modifications and variations can be devised without departing from the scope of the invention.

What is claimed is:

1. An input channel switching control device for a display monitor having a DDC function which comprises a DVI-I interface supporting respective video signals of analog specification and digital specification inputted from an external computer, comprising:

a discriminator that judges whether each of said video signals inputted from said external computer is a signal of analog specification or digital specification and also judges whether the state of an input channel is an analog channel or a digital channel;

an EDID data memory that stores EDID data of analog specification and EDID data of digital specification;

an input channel switch that switches the state of said input channel into a channel of the specification of said video signal which is judged by said discriminator; and a DDC control that reads and transmits to said external computer said EDID data of the specification corresponding to the state of said input channel which is judged by said discriminator out from said EDID data memory on the basis of a DDC transmission request from said external computer, wherein said input channel switch switches the state of said input channel after said DDC control transmits said EDID data to said external computer.

2. The input channel switching control device for a display monitor according to claim 1, wherein said input channel switch further switches the state of said input channel in accordance with an input channel switching request from a user, said input channel switching control device further comprising:

a hot plug line interrupter that opens a hot plug line at a connector which connects said external computer thereto for a predetermined time when the state of said input channel is switched in response to said input channel switching request from said user.

3. The input channel switching control device for a display monitor according to claim 2, wherein said discriminator further judges a vertical retrace interval of said display monitor, and said input channel switch switches the state of said input channel in accordance with said input channel switching request from said user at a timing of said vertical retrace interval judged by said discriminator.

4. An input channel switching control device for a display monitor having a DDC function which comprises a DVI-I interface supporting respective video signals of analog specification and digital specification inputted from an external computer, comprising:

a discriminator that judges whether each of said video signals inputted from said external computer is a signal of analog specification or digital specification and also judges whether the state of an input channel is an analog channel or a digital channel;

an EDID data memory that stores EDID data of analog specification and EDID data of digital specification;

an input channel switch that switches the state of said input channel into a channel of the specification of said video signal which is judged by said discriminator;

a DDC control that reads and transmits to said external computer said EDID data of predetermined specification out from said EDID data memory on the basis of a DDC transmission request from said external computer; and a selector that is capable of making a selection on whether said EDID data of said predetermined specification read out from said EDID data memory by said DDC control is said EDID data of the specification of said video signal which is judged by said discriminator or said EDID data of the specification corresponding to the state of said input channel which is judged by said discriminator, wherein said input channel switch switches the state of said input channel after said DDC control transmits said EDID data to said external computer, when said EDID data of the specification corresponding to the state of said input channel is selected by said selector.

* * * * *